United States Patent [19]
Karow et al.

[11] Patent Number: 5,937,420
[45] Date of Patent: Aug. 10, 1999

[54] POINTSIZE-VARIABLE CHARACTER SPACING

[75] Inventors: Peter Karow, Hamburg, Germany; John R. MacMillan, Portola Valley, Calif.

[73] Assignee: Adobe Systems Incorporated, San Jose, Calif.

[21] Appl. No.: 08/686,212

[22] Filed: Jul. 23, 1996

[51] Int. Cl.⁶ .................................................. G06F 17/21
[52] U.S. Cl. .......................................... 707/518; 345/467
[58] Field of Search .................... 707/518–9; 345/467–8, 345/144

[56] References Cited

U.S. PATENT DOCUMENTS

| | | | |
|---|---|---|---|
| 4,591,999 | 5/1986 | Logan | 707/519 |
| 4,933,866 | 6/1990 | Markoff et al. | |
| 5,319,358 | 6/1994 | Martinez et al. | |
| 5,432,890 | 7/1995 | Watanabe | 707/519 |
| 5,501,538 | 3/1996 | Sawada et al. | 400/304 |
| 5,598,520 | 1/1997 | Harel et al. | 345/469 |
| 5,623,593 | 4/1997 | Spells, III | 345/472 |
| 5,724,596 | 3/1998 | Lathrop | 395/150 |

FOREIGN PATENT DOCUMENTS

| | | |
|---|---|---|
| 0 465 704 B1 | 1/1995 | European Pat. Off. |

OTHER PUBLICATIONS

Boag A., 1994, "Fonts: a survey of current issues," Desktop Publishing Commentary, vol. 10, No. 2 ISSN 0957–3178, UK, pp. 6–9.

Haralambous, Y. Sep., 1993, "Parametrization of PostScript fonts through METAFONT–an alternative to Adobe Multiple Master Fonts," Third Internation Conference on Raster Imaging and Digital Typography, RIDT '94, Darmstadt, Germany, 11–13 Apr. 1994, vol. 6, No. 3, ISSN 0894–3982, UK, pp. 145–157.

Karow, Peter, Digital Typefaces, Springer Verlag, 1994, ISBN 3–540–56509–4, pp. 139–184.

Karow, Peter, Font Technology, Springer Verlag, 1994, ISBN 3–540–57223, pp. 173–192.

McQueen, C.D., III et al., Apr. 1994, "Infinifont: A parametric font generation system," Third International Conference on Raster Imaging and Digital Typography, RIDT '94, Darmstadt, Germany, 11–13 Apr. 1994, vol. 6,No. 3, ISSN 0894–3982, UK, pp. 117–132.

URW Software & Type GmbH, "Micro–typography for advanced typesetting," hz–program, 1993, pp. 15–25.

URW Software and Type GmbH, "Kernus," 1993, pp. 1–20.

Apple Computer, QuickDraw GX Fonts Formats, 1995—pages printed from Apple WWW Site.

Apple Computer, About QuickDraw GX Fonts, 1995—pages printed from Apple WWW Site.

Apple Computer, Optical Bounds Table, 1995—pages printed from Apple WWW Site.

Apple Computer, Kerning Table, 1995—pages printed from Apple WWW Site.

Fenton, E., "Inside QuickDraw GX Fonts", Macworld, 1994—pp. 122–126.

*Primary Examiner*—Stephen S. Hong
*Attorney, Agent, or Firm*—Fish & Richardson P.C.

[57] ABSTRACT

A computer-implemented method for spacing characters rendered from a digital font at an output pointsize. The font has first spacing metrics for a small pointsize and for a different large pointsize. The method includes calculating a separation by interpolating the small pointsize metrics and the large pointsize metrics and spacing the pair as a function of the calculated separation. Embodiments may include the following features. The font has spacing metrics for at least three different pointsizes. The spacing metrics include left sidebearings, right sidebearings, or kerning values. A kerning value for a character pair is generated by interpolating a first kerning value at a small pointsize and a second kerning value at a large pointsize to the output pointsize. The invention also features a computer program on a computer-readable medium having instructions for rendering characters and two sets of spacing metrics at two different pointsizes. The invention also features a computer program having instructions for rendering a set of characters and a set of kerning values for all pairs consisting of one character from the set of characters and the space character.

34 Claims, 7 Drawing Sheets

Television-
HHOOAVV
— 6 PT SPACING / 72 PT PRINTING

Television-
HHOOAVV
— 12 PT SPACING / 72 PT PRINTING

Television-
HHOOAVV
— 72 PT SPACING / 72 PT PRINTING

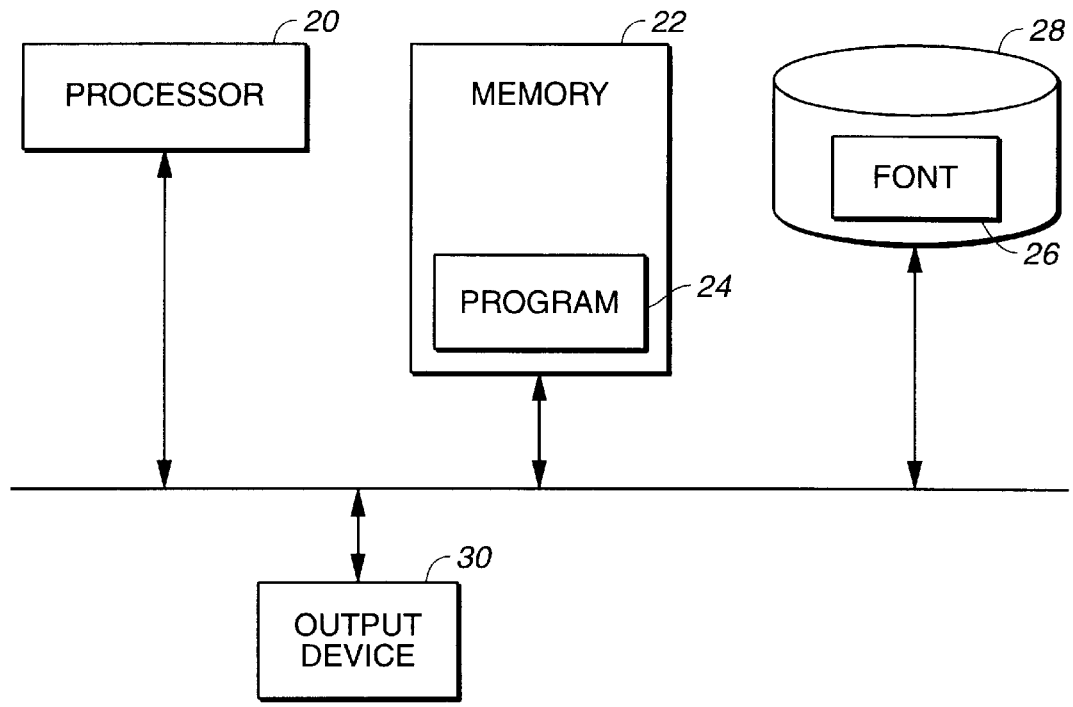
FIG._1
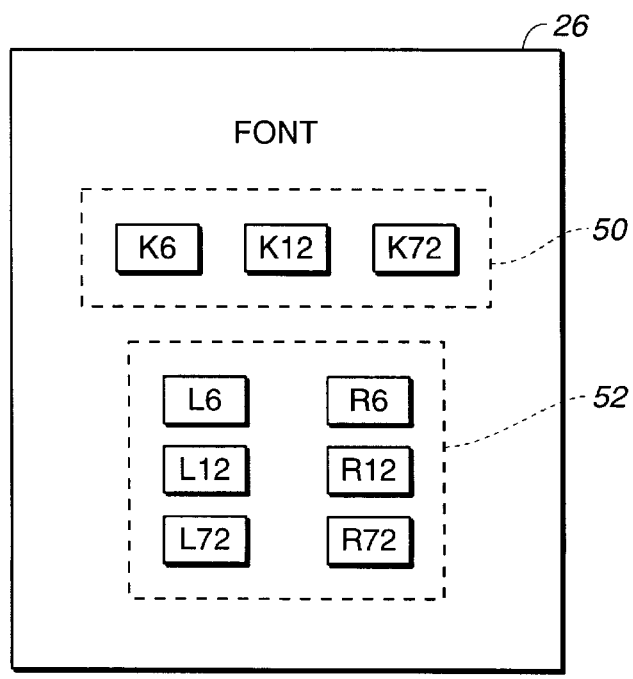
FIG._6

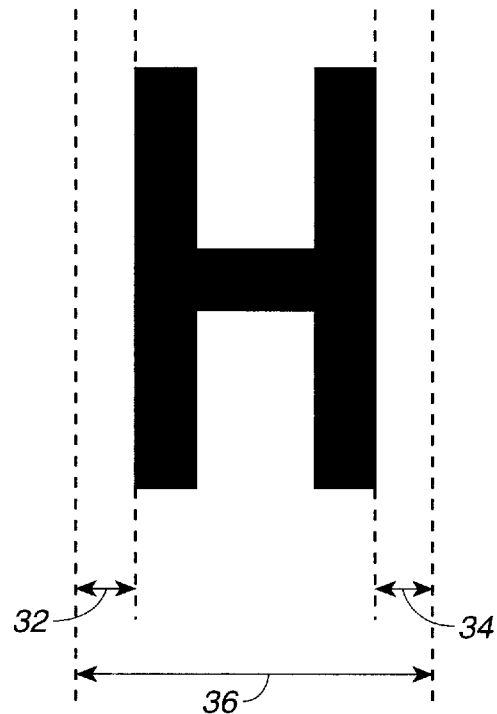
FIG._2
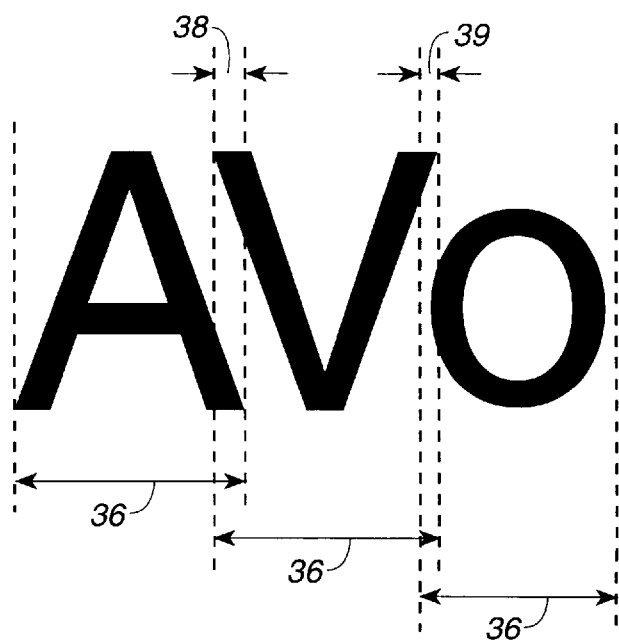
FIG._3

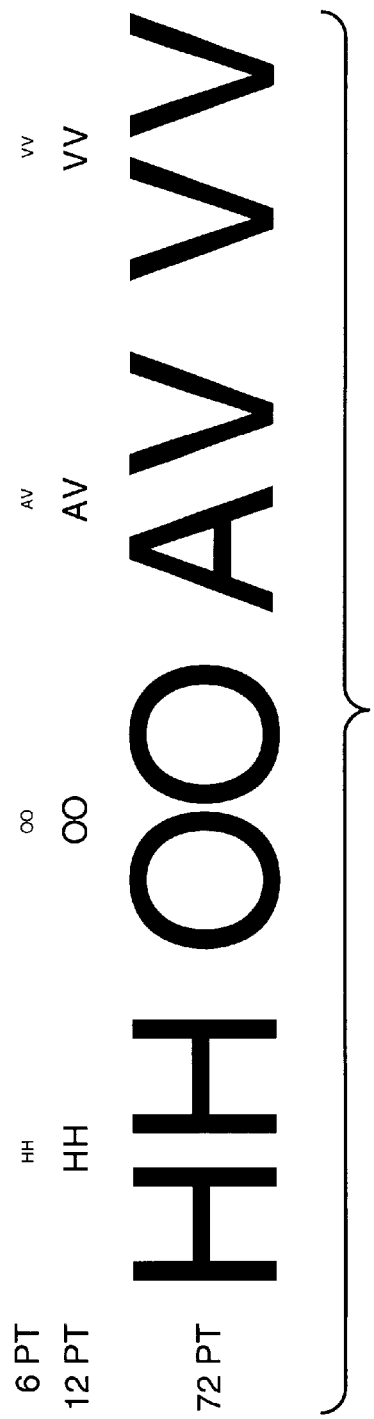
FIG._4A
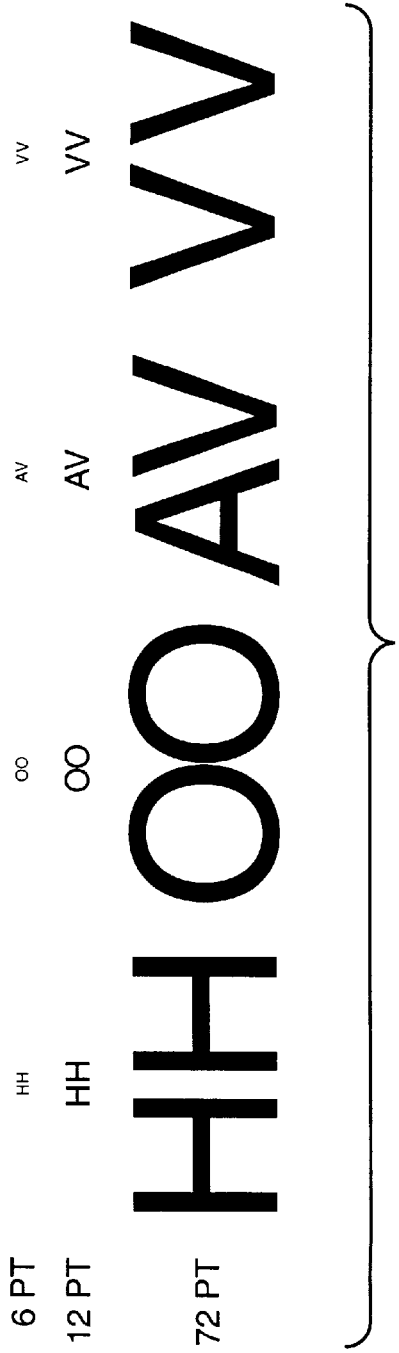
FIG._4B

Television-
HHOOAVV

6 PT SPACING
72 PT PRINTING

Television-
HHOOAVV

12 PT SPACING
72 PT PRINTING

Television-
HHOOAVV

72 PT SPACING
72 PT PRINTING

FIG._5A

Television-
HHOOAVV

6 PT SPACING
72 PT PRINTING

Television-
HHOOAVV

12 PT SPACING
72 PT PRINTING

Television-
HHOOAVV

72 PT SPACING
72 PT PRINTING

*FIG._5B*

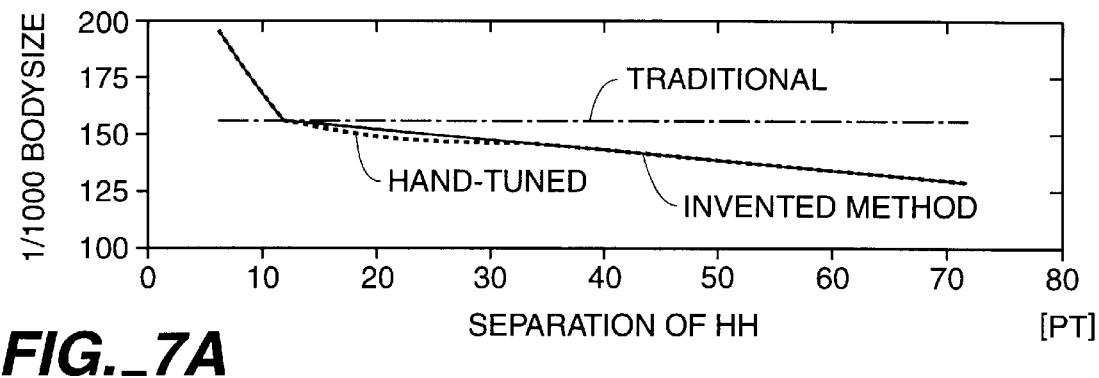
FIG._7A
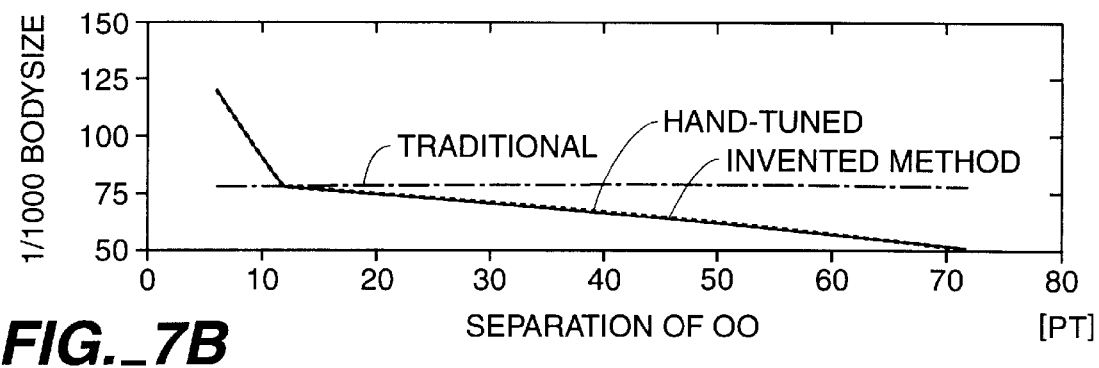
FIG._7B
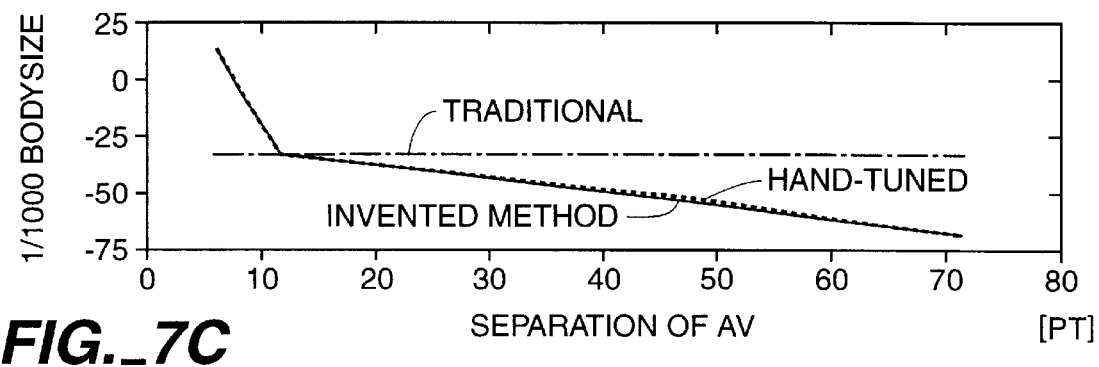
FIG._7C
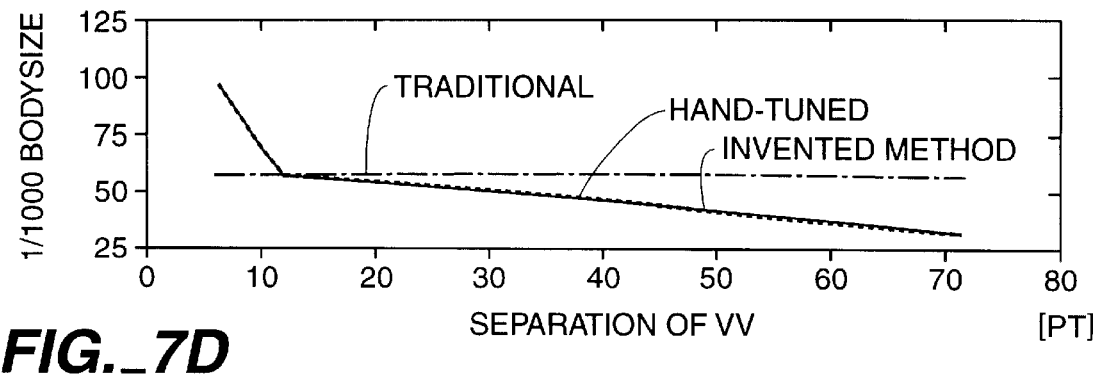
FIG._7D

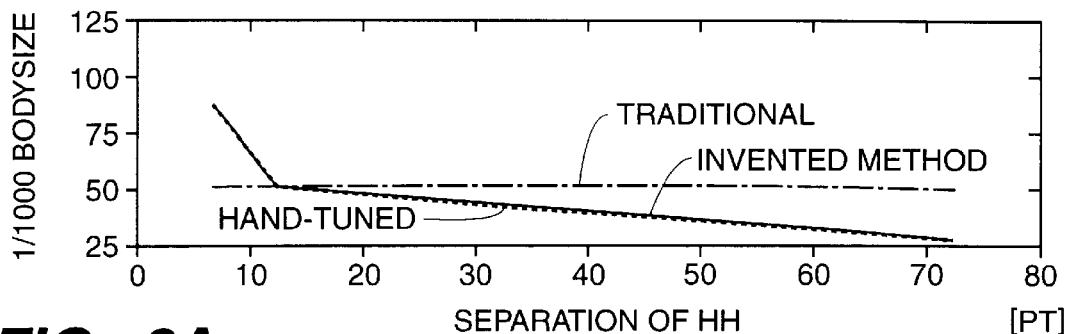
FIG._8A
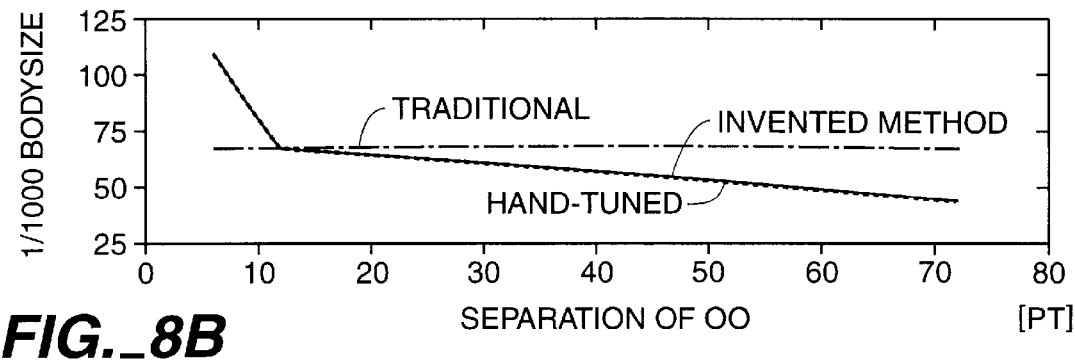
FIG._8B
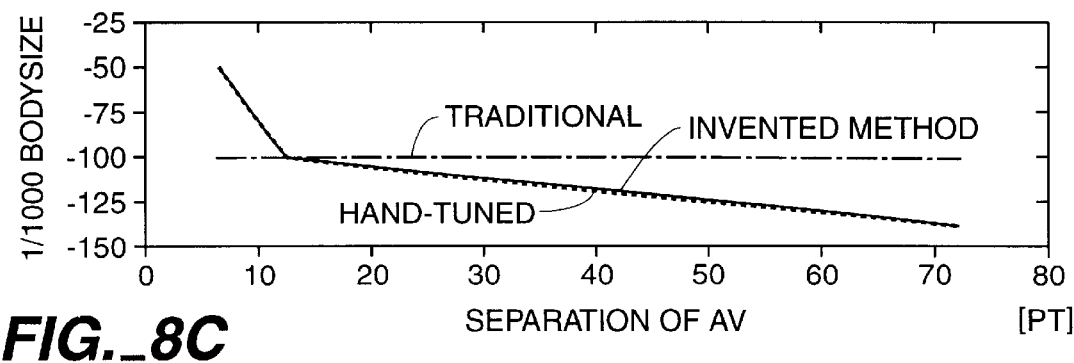
FIG._8C
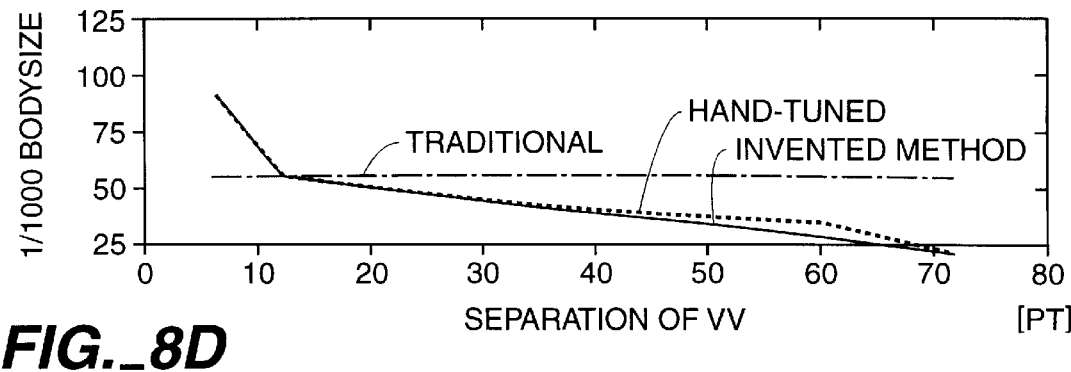
FIG._8D

POINTSIZE-VARIABLE CHARACTER SPACING

BACKGROUND

This invention relates to the generation of the spacing of characters for output to devices such as display screens, laser printers, photo typesetters and laser film recorders at a range of pointsizes.

A set of characters with a particular design is called a "typeface". A digital font (referred to here simply as a "font"), such as any of the PostScript® fonts available from Adobe Systems Incorporated of Mountain View, Calif., generally includes instructions (normally read and interpreted by rendering programs executing on computer processors) for rendering characters in a particular typeface. A digital font stores outlines and "hints" of characters along with the font's so-called "font metrics", which relate to the spacing of characters in order to form words of text. Digital font formats are described in detail in the literature. See, for example, Peter Karow, Digital Typefaces, Springer Verlag, 1994, ISBN 3-540-56509-4, pages 139 et seq. As used here, the term "character" refers to any form of character, number, symbol, icon, graphic, or the like that can be output as a graphical element.

The appearance of a typeface is affected not only by the appearance of individual characters, but also by the way the characters are spaced within a character string. See, for example, Peter Karow, Font Technology, Springer Verlag, 1994, ISBN 3-540-57223-6, pages 173 et seq. Accordingly, fonts that support proportional spacing often include spacing metrics providing instructions for defining the spaces between characters.

Furthermore, text processing software may supply "tracking", which provides a constant small amount of additional space between the characters in text output. If a positive or negative tracking value is chosen, that amount is applied no matter what the character pairs are or the pointsize is. Tracking does not take in account that different character pairs require different amounts of additional spacing.

Spacing metrics for enabling proportional spacing are typically generated for output at a specific pointsize, traditionally 12 points, and if an application calls for output at a different pointsize, the spacing is simply scaled linearly. This will be referred to as "traditional" spacing. Unfortunately, linear scaling based on spacing metrics for a single reference pointsize does not produce consistently good results. This is because proper spacing between a character pair can vary with different typefaces, different pairs of characters, and different pointsizes. In general, for clear output, characters at smaller pointsizes require proportionally larger inter-character spaces than do characters at larger pointsizes.

Existing techniques for spacing each character pair based on the specific characteristics of that character pair are costly to use. One method, termed "automatic kerning", calculates spacing between specific character pairs at output pointsizes on demand, within an application program like Adobe PageMaker. Traditionally, "kerning" refers to a technique of adjusting the spacing of only specific character pairs (called "critical character pairs") based on the shapes of the character strokes. Automatic kerning recognizes that all pairs are critical character pairs and have special spacing requirements, and also recognizes that wider spacing is generally required for characters output at smaller pointsizes, whereas narrower spacing is generally required for characters output at larger pointsizes. Automatic kerning is explained in greater detail in commonly assigned European Patent EP 0 465 704 B1, which discloses a method for automatically generating, for a font at a pointsize, kerning values for a set of critical character pairs and sidebearing values for all characters of the font.

However, automatic kerning requires analysis of the specific font, the specific pointsize, and the specific character combination each time it is applied. Accordingly, it often requires more processing time and power than is reasonably available.

SUMMARY

In general, in one aspect, the invention features a computer-implemented method for spacing a pair of characters rendered from a digital font for adjacent display at an output pointsize, where the font has first spacing metrics for a small pointsize not greater than the output pointsize and for a different large pointsize not less than the output pointsize. The method includes the steps of calculating a separation at the output pointsize by interpolating the small pointsize first spacing metrics and the large pointsize first spacing metrics for the pair of characters or either of them, and spacing the pair as a function of the calculated separation.

Preferred embodiments of the invention include one or more of the following features. The first spacing metrics are kerning values. The first spacing metrics are right sidebearings and the step of interpolating is applied to the right sidebearings of one character of the pair; the font has as second spacing metrics left sidebearings for the small pointsize and left sidebearings for the large pointsize; and the step of calculating the separation includes interpolating the small pointsize right sidebearings and the large pointsize right sidebearings for one of the characters and interpolating the small pointsize left sidebearings and the large pointsize left sidebearings for the other of the characters. The small pointsize is not greater than 12 points and the large pointsize is not less than 12 points. The font has first spacing metrics for at least three different pointsizes; for example, the font has first spacing metrics for pointsizes of 6 points, 12 points, and 72 points. The first spacing metrics are left sidebearings, right sidebearings, or kerning values. The step of interpolating includes calculating a linear interpolation of the small pointsize and large pointsize first spacing metrics. The step of calculating the separation includes calculating the sum of an interpolated right sidebearing for one character of the pair plus an interpolated left sidebearing for the other character of the pair plus an interpolated kerning value for the pair.

In general, in another aspect, the invention features a computer-implemented method for spacing a pair of characters rendered from a digital font for adjacent display at an output pointsize. The method includes the steps of establishing a set of large pointsizes; establishing a set of small pointsizes each smaller than any of the large pointsizes; calculating the spacing for the pair as a spacing function of the output pointsize, where the function calculates a spacing for each of the small pointsizes that is greater in proportion to the pointsize than is the spacing calculated by the function for any of the large pointsizes; and displaying the pair of characters with the calculated spacing.

Preferred embodiments of the invention include one or more of the following features. The spacing function is defined for a pointsize argument that extends at least from 6 point to 72 point. A pointsize of 12 point separates the set of smaller pointsizes from the set of larger pointsizes.

In general, in another aspect, the invention features a computer-implemented method of generating output spacing for a character at an output pointsize from a digital font having spacing metrics including multiple sets of left and right sidebearing values, each set for output at a different pointsize. The method includes the steps of selecting for the character pair a first pair of left and right sidebearing values and a second pair of left and right sidebearing values from the spacing metrics for a first pointsize and a second pointsize, respectively, the first pointsize being no greater than the output pointsize and the second pointsize being no less than the output pointsize; generating a left sidebearing value for the character at the output pointsize by interpolating the first left sidebearing value and the second left sidebearing value to the output pointsize; and generating a right sidebearing value for the character at the output pointsize by interpolating the first right sidebearing value and the second right sidebearing value to the output pointsize.

Preferred embodiments of the invention include one or more of the following features. The pairs of sidebearing values include a pair of sidebearing values for output at 12 point and a pair of sidebearing values for output at 6 point or at 72 point. The spacing metrics include pairs of sidebearing values for at least three different pointsizes. The pairs of sidebearing values include a pair for output at 6 point, a pair for output at 12 point, and a pair for output at 72 point. The interpolating is linear.

In general, in another aspect, the invention features a computer-implemented method of generating output spacing for a character pair at an output pointsize from a digital font having spacing metrics including multiple sets of kerning values, each set for output at a different pointsize. The method includes the steps of selecting for the character pair a first kerning value and a second kerning value from the spacing metrics for a first pointsize and a second pointsize, respectively, the first pointsize being no greater than the output pointsize and the second pointsize being no less than the output pointsize; and generating a kerning value for the character pair by interpolating the first kerning value and the second kerning value to the output pointsize.

Preferred embodiments of the invention include one or more of the following features. The sets of kerning values include a set of kerning values for output at 12 point and a set of kerning values for output at 6 point or at 72 point. The spacing metrics include kerning values for at least three different pointsizes. The sets of kerning values include a set for output at 6 point, a set for output at 12 point, and a set for output at 72 point. The interpolating is linear.

In general, in another aspect, the invention features an article of manufacture having a computer program (which term encompasses a digital font) embodied on a computer-readable medium, the computer program including character rendering instructions for rendering the appearance of a first character; a set of left sidebearings at a first pointsize including a left sidebearing for the first character; a set of right sidebearings at the first pointsize including a right sidebearing for the first character; a set of left sidebearings at a different second pointsize including a left sidebearing for the first character; and a set of right sidebearings at the second pointsize including a right sidebearing for the first character.

Preferred embodiments of the invention include one or more of the following features. The computer program includes a set of left sidebearings at a different third pointsize including a left sidebearing for the first character, and a set of right sidebearings at the third pointsize including a right sidebearing for the first character. The computer program includes character rendering instructions for rendering the appearance of a second character; a set of kerning values at a first pointsize including a kerning value for a pair consisting of the first character followed by the second character; and a set of kerning values at a different second pointsize including a kerning value for the pair. The computer program includes a set of kerning values at a different third pointsize including a kerning value for the pair.

In general, in another aspect, the invention features an article of manufacture having a computer program embodied on a computer-readable medium, the computer program including character rendering instructions for rendering the appearance of a first character and a second character; a set of kerning values at a first pointsize including a kerning value for a pair consisting of the first character followed by the second character; and a set of kerning values at a different second pointsize including a kerning value for the pair.

Preferred embodiments of the invention include one or more of the following features. The computer program includes a set of kerning values at a different third pointsize including a kerning value for the pair.

In general, in another aspect, the invention features an article of manufacture including a computer program embodied on a computer-readable medium having character rendering instructions for rendering the appearance of a set of characters not including a space character, and a set of kerning values at a first pointsize including a kerning value for all pairs consisting of one character from the set of characters and the space character.

Preferred embodiments of the invention include one or more of the following features. The program includes a second set of kerning values at a different second pointsize including a kerning value for all the pairs. The program further includes a third set of kerning values at a different third pointsize including a kerning value for all the pairs. The set of characters includes at least the English alphabet of twenty-six letters in upper and lower case.

In general, in another aspect, the invention features a method for justifying to a left margin and a right margin a line of text having a left-most text character and a right-most text character. The method includes the steps of obtaining a first kerning value for the character pair (space, left-most text character) and a second kerning value for the character pair (right-most text character, space), positioning the left-most text character at the left margin according to the first kerning value, and positioning the right-most text character at the right margin according to the second kerning value.

In general, in another aspect, the invention features a method for spacing characters rendered from a digital font. The method includes the steps of reading kerning information into a random access memory; adding the kerning information to a matrix of elements in the random access memory, where the matrix elements are addressable by pairs of character numbers from the digital font and kerning information for a pair of characters is added to the matrix element addressed by the pair; using a pair of characters to be spaced to address the matrix and obtain a matrix value from the matrix; using the matrix value to calculate a separation for the pair of characters to be spaced; and spacing the pair as a function of the calculated separation.

Preferred embodiments of the invention include one or more of the following features. The matrix has allocated to it at least about 200K bytes of the random access memory and the value of each matrix element addressable by a pair of characters is a kerning value for that pair of characters.

The method includes the steps of reading left sidebearing information and right sidebearing information for a set of characters into the random access memory; and adding the left sidebearing information and right sidebearing information to the matrix elements for the corresponding characters. The value of each matrix element is the sum of a kerning value, a left sidebearing value, and a right sidebearing value. The kerning information includes a set of class definitions read that indicate when accented characters inherit kerning values from their base characters.

Among the advantages of the invention are the following. The invention provides good readability for text over a substantial range of small to large pointsizes without requiring hand-tuning of character spacing. The invention provides pointsize-variable kerning of character pairs. The invention provides pointsize-variable sidebearings for characters. The invention provides pointsize-variable kerning of characters against the space character to provide visually attractive interspacing between words. The invention provides visually pleasing alignment of justified text to a left and right margin to create what will be called "optical margins". The invention may be applied over tracking. The invention may be used with, and as an extension of, existing digital fonts. The invention may be implemented to achieve its advantages at very little cost in execution time.

For a fuller understanding of the nature and further advantages of the invention, reference should be made to the detailed description taken in conjunction with the accompanying drawings.

BRIEF DESCRIPTION OF THE DRAWINGS

FIG. 1 is a diagram illustrating apparatus suitable for the present invention.

FIG. 2 illustrates spacing metrics that may be used in the invention.

FIG. 3 illustrates an application of negative kerning.

FIG. 4a and FIG. 4b illustrate spacing of character pairs.

FIG. 5a and FIG. 5b compare the appearance of spacing generated by a method of the invention with conventional spacing at three pointsizes.

FIG. 6 is a diagram illustrating elements of a font of the present invention.

FIG. 7 (which consists of FIGS. 7a, 7b, 7c, and 7d) illustrates the results of applying the invention to four character pairs at a range of pointsizes in a Helvetica typeface.

FIG. 8 (which consists of FIGS. 8a, 8b, 8c, and 8d) illustrates the results of applying the invention to four character pairs at a range of pointsizes in a Times Roman typeface.

DETAILED DESCRIPTION

Referring to FIG. 1, an apparatus suitable for implementing a method for pointsize-variable spacing of characters for output includes a computer processor 20, such as an integrated circuit microprocessor, and a memory 22, such as semiconductor RAM or ROM, for storing instructions and data executed and used by the processor 20. The processor 20 running under control of a program 24 in the memory 22 has access to a font 26 that is stored in a machine-readable form in the memory 22 or on a separate storage device 28 such as a hard disk drive or a removable diskette. The font includes a set of instructions that may be rendered by a program 24 running on by the processor 20, which is coupled, directly or indirectly, to an output generating device 30, such as a display screen, laser printer print engine, photo typesetter, or laser film recorder. The processor 20 and memory 22 may be embedded in a peripheral device, such as a PostScript laser printer. Because it includes a set of instructions, the font itself is also a computer program.

The methods described here may be readily implemented in hardware, firmware, or equivalents such as application-specific integrated circuits (ASICs), or in a computer program product tangibly embodied in a computer program storage device for execution by a computer processor. Storage devices suitable for tangibly embodying computer program instructions implementing the methods described here include all forms of non-volatile memory, including semiconductor memory devices, such as EPROM, EEPROM, and flash memory devices, magnetic disks such as internal hard disks and removable disks, magneto-optical disks, and CD-ROM disks.

Referring to FIG. 2, total width 36 and left and right sidebearings 32 and 34 are traditional parameters (values) that are defined for the characters of a font and stored as font metrics. Traditionally, these values are defined for only one pointsize and are optimized for that pointsize, which is generally 12 points (pt).

When only sidebearings are used, some character pairs get spacing that is too wide, while others get spacing that is too narrow. To correct this, kerning tables are employed, which have correction values for critical character pairs. Generally, use of kerning tables results in a gap between two characters is smaller than would result from only using the characters' constant sidebearings. FIG. 3 illustrates the application of negative kerning—kerning that subtracts distance between characters—applied to the character pair 'AV' (negative kerning distance 38) and the character pair 'Vo' (negative kerning distance 39).

Digital fonts generally have a single kerning table that may contain 200 to 600 kerning values for selected character pairs optimized for one pointsize. This is not enough to provide correct spacing for all pointsizes.

Referring to FIG. 4a and FIG. 4b, the considerations involved in applying the method of pointsize-variable spacing may be described with reference to four illustrative character pairs: HH, OO, AV, and VV. These four pairs have two vertical strokes (HH), two opposite round strokes (OO), two parallel diagonal strokes (AV), and two opposite diagonal strokes (VV) forming the boundaries of their respective character interspaces. These character interspaces should behave differently when the pointsize for writing is changing from small to large, in order to achieve a harmonious appearance at all pointsizes, as is illustrated by the figures.

FIG. 4a shows the four character pairs with traditional spacing at the three pointsizes of 6 pt, 12 pt, and 72 pt. For comparison, FIG. 4b shows the same character pairs with pointsize-variable spacing at the same pointsizes. As is apparent from the figures, all four pairs are well spaced in FIG. 4b, while in FIG. 4a some pairs are spaced too far apart, and some, too close together. In particular, FIG. 4a and FIG. 4b show the following:

HH is wider at lower, and narrower at larger, pointsizes. The white character interspace has the form of a rectangle. HH usually has no kerning value assigned.

OO is also wider at lower, and narrower at larger, pointsizes, but in total OO is spaced narrower with respect to the character widths than HH because the two opposite round stems leave more white space at the top and at the bottom. The white character interspace has the form of an hour-glass. OO usually has no kerning value assigned; spacing is achieved by the left and right sidebearings only.

AV always needs to be kerned negatively. The separation could be narrower at larger pointsizes, depending on the style of the typeface. The shape of the white character interspace is a parallelogram.

VV needs to be kerned positively at lower pointsizes. Above 72 pt, the separation gets relatively narrower. The shape of the white character interspace is a triangle.

These examples show four different forms as character interspace: rectangle, hour-glass, parallelogram, and triangle. Following the typographer's rule—the more even the color of a page of text, the more easily it can be read—one would give the same area to all different character interspaces. This is not literally possible or desirable, as will now be described.

The rectangle between HH is taken as the normalizing area for the purpose of the following comparisons. If that area is adopted for VV, the area of the triangle would be too small and cause the letters to overlap. In contrast, AV would look too narrow because human readers are accustomed to see this pair with a relative large white character interspace. Similarly, OO would look too narrow if the hour-glass area were normalized in size to the HH rectangle. As with the pair VV, one has to keep a certain minimum separation between the two Os. Also, it seems that the white areas of the hour-glass at the top and at the bottom do not contribute their mathematical share to the perceived white interspace. Consideration of just these few examples makes it clear that correct kerned spacing is also based on optical impression and perception, and not only on mathematical equations normalizing the areas of interspaces.

Referring to FIG. 6, a font 26 to be used in the method of pointsize-variable spacing includes, in addition to the character rendering instructions, hints, and tables normally found in a font, at least one additional set of spacing metrics. The embodiment to be described uses a font with three kerning tables 50, designated K6, K12, and K72, and three sets of sidebearings 52, designated L6 and R6, L12 and R12, and L72 and R72. These metrics are especially spaced, kerned and generated for reference pointsizes of 6 pt, 12 pt, and 72 pt, respectively. Equivalently, the multiple spacing metrics, including the multiple kerning values and the multiple sidebearing values, are kept in one or more multi-valued tables or other data structures.

The term "spacing metrics" is used here to encompass parameters describing the character spacing for a font. The specific parameters and the format in which they are represented may vary. The values for the spacing metrics parameters may be determined by any suitable method. For example, the kerning values for character pairs at a reference pointsize may be determined by hand or by the automatic kerning method described above. Further, the spacing metrics values may be represented in various formats without affecting the application of the method of pointsize-variable spacing.

As is conventional, spacing and other font metrics are given in so-called "units". A unit is one-1000th of a point, or about one-72000th of an inch. In one embodiment, the metric sets for 12 pt (K12, L12, and R12) contain absolute spacing values in units, whereas the sets for 6 pt and 72 pt contain spacing values expressed as differences from the 12 pt values. The kerning values expand the intercharacter space (if positive) or contract it (if negative). Differences are used for reasons of convenience and for speed in the calculations that will be described.

The spacing metrics (including kerning and sidebearing values) may be generated automatically by applying the automatic kerning method of the patent cited above (EP 0 465 704 B1) to the font multiple times—once for each of the pointsizes 6 pt, 12 pt, and 72 pt, for example. Alternatively, the metrics may be generated by hand, or generated automatically and then fine-tuned by hand.

In one embodiment, the spacing metrics include kerning values for characters paired with the space character. Use of such space-kerning values is advantageous in spacing words and in achieving visually pleasing margins for justified text. For example, at a justified left margin one can kern the first character of the line of text against a space character to place the character so as to achieve an optical margin. Without kerning, or with a kerning value of zero, the left edge of the total width of the text character is placed on the left margin. If the kerning value is negative, the character is shifted to the left; if positive, it is shifted to the right. Similarly, the last character of a line may be kerned against a space character to place the text character properly at a justified right margin. At a right margin, a negative kerning value shifts the last text character to the right and a positive value shifts it to the left.

The embodiment of the method of pointsize-variable spacing that will be described interpolates to the specified output pointsize based on two sets of spacing metrics: the set for pointsize 12 pt, and one of the sets for pointsize 6 pt or 72 pt, whichever is on the same side of 12 pt as the output pointsize is on. For example, spacing for a character pair at an output pointsize of 9 pt is interpolated from the spacing metrics for pointsizes 6 pt and 12 pt.

Various methods of interpolation may be used, and selection of a specific method may depend on the requirements of the application, as well as other variables including the typeface, the format of the sets of spacing metrics, the processing power available for generating output, or the processing time requirements. In the following paragraphs, a simple and sufficient linear interpolation method will be described.

As has been mentioned, three sets of right sidebearing values are referred to as R6, R12, and R72; three sets of left sidebearing values are referred to as L6, L12, and L72; and three sets of kerning values are referred to as K6, K12, and K72. For an output pointsize of X, spacing metrics values referred to as RX, LX, and KX are calculated, and the spacing for a specific character pair $C_1C_2$ is calculated as the sum $$RX(C_1)+LX(C_2)+KX(C_1C_2).$$

For an output pointsize X, which need not be an integer, an interpolation factor F is calculated by applying the following rules.

$$\begin{aligned}
\text{For:} \quad & X \le 6, & F &= 1 \\
& 6 < X < 12, & F &= (12 - X)/6 \\
& 12 \le X \le 72, & F &= (X - 12)/60 \\
& 72 < X, & F &= 1
\end{aligned} \quad (1)$$

Alternatively, the interpolation may be extended so that the factor F for pointsizes less than 6 pt is greater than 1 and the factor F for pointsizes greater than 72 pt is greater than 1.

Interpolation factor F may either be calculated as needed during execution of an application, or interpolation factors may be precalculated for a range of output pointsizes and stored in a lookup table. In either case, for linear interpolation, once interpolation value F is determined, values for RX, LX, and KX are calculated by linear interpolation from two sets of spacing metrics. The following equations (2) provide a linear interpolation for output pointsizes between 6 pt and 12 pt or between 12 pt and 72 pt, with a linear or constant extrapolation for pointsizes less than 6 pt or greater than 72 pt. In these equations, variables RY, LY, and KY refer to the outside set of spacing metrics: R6, L6, and K6 if X<12; or R72, L72, and K72 if X>12. (F=0 if X=12.)

$$RX = R12 + F \times RY \quad (2)$$

$$LX = L12 + F \times LY$$

$$KX = K12 + F \times KY$$

The range of reasonably likely output pointsizes runs from 4 pt (very hard to read) to 200 pt (poster type, very rarely used), but a common working range is from 8 pt to 24 pt. The three pointsizes (6 pt, 12 pt, and 72 pt) were chosen as optimal in terms of storage requirements and placement for interpolation for this common range. Other choices for the pointsizes and/or a different number of pointsizes could be used for interpolation, as could other, non-linear, interpolation methods.

The sidebearing values (L6, L12, and so on) are conventionally stored in a table (array) and addressed by character number, that is, by the internal representation of a letter or other character in a digital alphabet, which normally has on the order of 300 characters. Normally, a kerning table stored on a disk or transmitted with a document, as part of font, for example, would be expected to have values for only about 3000 critical character pairs (3000×2=6 K bytes), so that any of various techniques may be used to reduce the required disk storage or data transmission time at the cost of some extra processing. In one such technique, a set of kerning classes is defined and stored in a table or other suitable data structure to indicate when accented characters inherit the kerning values from their base characters, thereby reducing the number of character pairs that need to be stored. For example, in defining a class kerning table it would be recognized that the kerning for the pairs ÂT, ÄT, ÀT, ÁT, and ÃT is the same as for the pair AT, while the kerning for Te is not the same as for Tè, Té, Tê, or Të.

The kerning values (K6 and so on) can be stored at run time as an expanded matrix addressed by a pair of character numbers, which for an alphabet of 300 characters would require an allocation of 300×300×2 (about 200K) bytes of storage, which is reasonable in a modern personal computer. In one alternative embodiment, the run-time matrix is sized to be addressable by all pairs of characters in the alphabet. In this embodiment, the matrix value for a character pair may be a kerning value or, alternatively, the sum of a right sidebearing for the first character of the pair, a kerning value, and a left sidebearing for the second character of the pair (assuming the characters are written left to right). If such composite spacing metrics are stored in matrices for pointsizes of 6 pt, 12 pt, and 72 pt, for example, the calculations described below can be simplified accordingly.

The following example will illustrate spacing of the character pairs AV and VV at output pointsizes X1=6, X2=9, X3=12, X4=42, and X5=72. The spacing metrics values for the characters A and V are:

| | | | | |
|---|---|---|---|---|
| A: | R6 = 5 | | V: | R6 = 5 |
| | R12 = 0 | | | R12 = 0 |
| | R72 = −3 | | | R72 = −3 |

| | | | | |
|---|---|---|---|---|
| | L6 = 5 | | | L6 = 5 |
| | L12 = 0 | | | L12 = 0 |
| | L72 = −3 | | | L72 = −3 |
| AV: | K6 = 10 | | VV: | K6 = 3 |
| | K12 = −80 | | | K12 = 5 |
| | K72 = −10 | | | K72 = −10 |

First, interpolation factors F are calculated in accordance with the equations (1), above: FX1=1; FX2=0.5; FX3=0; FX4=0.5; and FX5=1.

Next, for character pair AV, RX is determined for A, LX is determined for V, and KX is determined for AV, in accordance with equation (2), based on the spacing metrics given above:

$$X1: RX1(A) = R12(A) + FX1 \times R6(A) = 0 + 5 = 5$$
$$LX1(V) = L12(V) + FX1 \times L6(V) = 0 + 5 = 5$$
$$KX1(AV) = K12(AV) + FX1 \times K6(AV) = -80 + 10 = -70$$

$$\text{Total spacing} = RX1(A) + LX1(V) + KX1(AV) = -60$$

$$X2: RX2(A) = R12 + FX2 \times R6 = 0 + 0.5 \times 5 = 2.5$$
$$LX2(V) = L12 + FX2 \times L6 = 0 + 0.5 \times 5 = 2.5$$
$$KX2(AV) = K12 + FX2 \times K6 = -80 + 0.5 \times 10 = -75$$

$$\text{Total spacing} = RX2(A) + LX2(V) + KX2(AV) = -70$$

Similarly, for X3 the total spacing is −80; for X4 the total spacing is −88; and for X5 the total spacing is −96.

Carrying out the same calculations for a second example with the same output pointsizes X1 through X5 for the character pair VV, KX is determined for VV, and RX and LX are determined for V. Accordingly, for X1 the total spacing is 18; for X2 the total spacing is 11.5; for X3 the total spacing is 5; for X4 the total spacing is −3; and for X5 the total spacing is −11.

Review of the total spacing results for the character pairs AV and VV shows how spacings for character pairs are computed taking into consideration both the specific characters as well as the output pointsize. By interpolating from two sets of spacing metrics, the method computes spacings that are more accurate than could be calculated by simply scaling spacings derived from a single set of spacing metrics.

Referring to FIG. 7 and FIG. 8, spacings derived from the above-described embodiment of the method of pointsize-variable character spacing are compared with spacings derived from a number of hand-tuned sets of left and right sidebearing values and kerning values. In each of these figures, the spacing (vertical axis) is plotted against pointsize (horizontal axis). Spacing is normalized to units of one-1000th of the character body size. Character pointsize is in points. The generally horizontal plot line, labeled "traditional", shows the traditional spacing generated by using 12 pt spacing scaled linearly to the larger and smaller pointsizes. The plot line labeled "hand tuned" shows the results of hand-tuned spacing over a range of pointsizes, while the plot line labeled "invented method" shows the spacing generated by the present method of pointsize-variable character spacing. FIG. 7 shows spacings for the Helvetica typeface. FIG. 8 shows spacings for the Times Roman typeface. FIGS. 7a and 8a show the separations of HH as a function of the pointsize. Similarly, FIGS. 7b and 8b show the separations of OO; FIGS. 7c and 8c show the separations of AV; and FIGS. 7d and 8d show the separations of VV. These exemplary results for the character pairs HH, OO, AV, and VV show that use of three pointsize values gives a good approximation to hand-tuned spacing.

Although the present invention has been described in terms of a specific embodiment, the invention is not limited to this specific embodiment. For example, the interpolation may be applied to spacing metrics parameters other than kerning and sidebearings, such as, for example, optical margins, without diminishing the advantages of the present invention. Other forms of interpolation, such as nonlinear interpolations (within a range of 6 pt to 72 pt, for example) and nonlinear extrapolations (for example, below 6 pt or above 72 pt) may also be employed. (As used here, the term interpolation encompasses calculations that would strictly be termed extrapolations, unless context requires otherwise.) Also, interpolation may be limited only to sidebearing values, or only to kerning values, rather than being applied both to sidebearing values and to kerning values.

What is claimed is:

1. A computer-implemented method for spacing a pair of characters rendered from a digital font for adjacent display at an output pointsize, the font having first spacing metrics for a small pointsize not greater than the output pointsize and first spacing metrics for a different large pointsize not less than the output pointsize, comprising:

calculating a separation at the output pointsize by interpolating the small pointsize first spacing metrics and the large pointsize first spacing metrics for the pair of characters or either of them; and spacing the pair as a function of the calculated separation.

2. The method of claim 1, where the first spacing metrics are kerning values.

3. The method of claim 1, where:

the first spacing metrics are right sidebearings and the step of interpolating is applied to the right sidebearings of one character of the pair;

the font has as second spacing metrics left sidebearings for the small pointsize and left sidebearings for the large pointsize; and the step of calculating the separation includes interpolating the small pointsize right sidebearings and the large pointsize right sidebearings for one of the characters and interpolating the small pointsize left sidebearings and the large pointsize left sidebearings for the other of the characters.

4. The method of claim 1, where the small pointsize is not greater than 12 points and the large pointsize is not less than 12 points.

5. The method of claim 1, where the font has first spacing metrics for at least three different pointsizes.

6. The method of claim 1, where the font has first spacing metrics for pointsizes of 6 points, 12 points, and 72 points.

7. The method of claim 1, where the first spacing metrics are left sidebearings, right sidebearings, or kerning values.

8. The method of claim 1, where the step of interpolating includes calculating a linear interpolation of the small pointsize and large pointsize first spacing metrics.

9. The method of claim 1, where calculating the separation includes calculating the sum of an interpolated right sidebearing for one character of the pair plus an interpolated left sidebearing for the other character of the pair plus an interpolated kerning value for the pair.

10. A computer-implemented method of generating output spacing for a character at an output pointsize from a digital font having spacing metrics including multiple sets of left and right sidebearing values, each set for output at a different pointsize, comprising:

selecting for the character pair a first pair of left and right sidebearing values and a second pair of left and right sidebearing values from the spacing metrics for a first pointsize and a second pointsize, respectively, the first pointsize being no greater than the output pointsize and the second pointsize being no less than the output pointsize;

generating a left sidebearing value for the character at the output pointsize by interpolating the first left sidebearing value and the second left sidebearing value to the output pointsize; and generating a right sidebearing value for the character at the output pointsize by interpolating the first right sidebearing value and the second right sidebearing value to the output pointsize.

11. The method of claim 10, where the pairs of sidebearing values include a pair of sidebearing values for output at 12 point and a pair of sidebearing values for output at 6 point or at 72 point.

12. The method of claim 10, where the spacing metrics comprise pairs of sidebearing values for at least three different pointsizes.

13. The method of claim 12, where the pairs of sidebearing values include a pair for output at 6 point, a pair for output at 12 point, and a pair for output at 72 point.

14. The method of claim 10, where the interpolating is linear.

15. A computer-implemented method of generating output spacing for a character pair at an output pointsize from a digital font having spacing metrics including multiple sets of kerning values, each set for output at a different pointsize, comprising:

selecting for the character pair a first kerning value and a second kerning value from the spacing metrics for a first pointsize and a second pointsize, respectively, the first pointsize being no greater than the output pointsize and the second pointsize being no less than the output pointsize; and generating a kerning value for the character pair by interpolating the first kerning value and the second kerning value to the output pointsize.

16. The method of claim 15, where the sets of kerning values include a set of kerning values for output at 12 point and a set of kerning values for output at 6 point or at 72 point.

17. The method of claim 15, where the spacing metrics comprise kerning values for at least three different pointsizes.

18. The method of claim 17, where the sets of kerning values include a set for output at 6 point, a set for output at 12 point, and a set for output at 72 point.

19. The method of claim 15, where the interpolating is linear.

20. An article of manufacture comprising a digital font computer program embodied on a computer-readable medium, the digital font comprising:

character rendering instructions for rendering the appearance of a first character;

a set of left sidebearings at a first pointsize including a left sidebearing for the first character;

a set of right sidebearings at the first pointsize including a right sidebearing for the first character;

a set of left sidebearings at a different second pointsize including a left sidebearing for the first character; and a set of right sidebearings at the second pointsize including a right sidebearing for the first character.

21. The article of claim 20 further comprising:
a set of left sidebearings at a different third pointsize including a left sidebearing for the first character; and
a set of right sidebearings at the third pointsize including a right sidebearing for the first character.

22. The article of claim 20 further comprising:
character rendering instructions for rendering the appearance of a second character;
a set of kerning values at a first pointsize including a kerning value for a pair consisting of the first character followed by the second character; and
a set of kerning values at a different second pointsize including a kerning value for the pair.

23. The article of claim 22 further comprising:
a set of kerning values at a different third pointsize including a kerning value for the pair.

24. An article of manufacture comprising a digital font computer program embodied on a computer-readable medium, the digital font comprising:
character rendering instructions for rendering the appearance of a first character and a second character;
a set of kerning values at a first pointsize including a kerning value for a pair consisting of the first character followed by the second character; and
a set of kerning values at a different second pointsize including a kerning value for the pair.

25. The article of claim 24 further comprising:
a set of kerning values at a different third pointsize including a kerning value for the pair.

26. An article of manufacture comprising a digital font computer program embodied on a computer-readable medium, the digital font comprising:
character rendering instructions for rendering the appearance of a set of characters; and
a set of kerning values at a first pointsize including a kerning value for all pairs consisting of one non-space character from the set of characters and the space character.

27. The article of claim 26 further comprising:
a set of kerning values at a different second pointsize including a kerning value for all said pairs.

28. The article of claim 27 further comprising:
a set of kerning values at a different third pointsize including a kerning value for all said pairs.

29. The article of claim 26 where the set of characters includes at least the English alphabet of twenty-six letters in upper and lower case.

30. A method for spacing characters rendered from a digital font, comprising:
reading kerning information for critical character pairs from a digital font into a random access memory;
adding the kerning information to a matrix of elements in the random access memory, where the matrix is sized to be addressable by all pairs of characters in the digital font, the matrix elements are addressable by all pairs of character numbers from the digital fonts, and kerning information for a pair of characters is added to the matrix element addressed by the pair;
using a pair of characters to be spaced to address the matrix and obtain a matrix value from the matrix;
using the matrix value to calculate a separation for the pair of characters to be spaced; and
spacing the pair as a function of the calculated separation.

31. The method of claim 30 where the matrix has allocated to it at least about 200K bytes of the random access memory and the value of each matrix element addressable by a pair of characters is a kerning value for that pair of characters.

32. A method for spacing characters rendered from a digital font, comprising:
reading kerning information for critical character pairs from a digital font into a random access memory;
adding the kerning information to a matrix of elements in the random access memory, where the matrix elements are addressable by pairs of character numbers from the digital font, and kerning information for a pair of characters is added to the matrix element addressed by the pair;
using a pair of characters to be spaced to address the matrix and obtain a matrix value from an element of the matrix;
using the matrix value to calculate a separation for the pair of characters to be spaced;
spacing the pair as a function of the calculated separation;
reading from the digital font left sidebearing information and right sidebearing information for a set of characters into the random access memory; and
adding the left sidebearing information and right sidebearing information to the matrix elements for the corresponding characters.

33. The method of claim 32 where the value of each matrix element is the sum of a kerning value, a left sidebearing value, and a right sidebearing value.

34. The method of claim 30 where the kerning information includes a set of class definitions that indicate when accented characters inherit kerning values from their base characters.

* * * * *